United States Patent [19]

Beine et al.

[11] 4,199,994

[45] Apr. 29, 1980

[54] SYSTEM FOR MONITORING THE MECHANICAL PARAMETERS OF A PRESSURE VESSEL

[75] Inventors: Burkhard Beine, Krefeld Forstwald; Hermann Ostendorf, Krefeld; Günter Schmidt, Tönisvorst, all of Fed. Rep. of Germany

[73] Assignee: Siempelkamp Giesserei GmbH & Co., Krefeld, Fed. Rep. of Germany

[21] Appl. No.: 915,607

[22] Filed: Jun. 15, 1978

[30] Foreign Application Priority Data

Jun. 24, 1977 [DE] Fed. Rep. of Germany ....... 2728651

[51] Int. Cl.$^2$ ............................................. G01B 5/30
[52] U.S. Cl. ..................................................... 73/785
[58] Field of Search ...................... 73/779, 785–787, 73/826, 828

[56] References Cited

U.S. PATENT DOCUMENTS

| | | | |
|---|---|---|---|
| 2,667,068 | 1/1954 | Viehe et al. | 73/785 X |
| 3,747,400 | 7/1973 | Finsterwalder | 73/785 X |
| 3,793,878 | 2/1974 | Brunton | 73/785 |
| 3,914,991 | 10/1975 | Fletcher et al. | 73/826 X |

FOREIGN PATENT DOCUMENTS 2433521 1/1976 Fed. Rep. of Germany.

OTHER PUBLICATIONS

Moderner Druckbehalterbau–Sicherheitshüllen für Kernkraftwerke, H. Schulz, Krupp Technical Reports, vol. 34, (1976, No. 2–3).

*Primary Examiner*—Anthony V. Ciarlante
*Attorney, Agent, or Firm*—Karl F. Ross

[57] ABSTRACT

An erect cylindrical pressure vessel, especially for a nuclear reactor, is constituted from cast-iron or cast-steel elements and is stressed by axially extending angularly spaced axial stressing elements and by axially circumferential peripheral stressing elements or cables. At least one of the axially stressing cables and at least one of the peripheral stressing cables serving for sustaining the operating load of the pressure vessel, i.e. the working elements rather than the addition or additional elements, is provided with a measuring device which triggers an alarm upon the detection of a change in the force developed at the respective stressing element or the length change thereof reaching 90% of the corresponding change at the pressure rating of the vessel.

14 Claims, 7 Drawing Figures

SYSTEM FOR MONITORING THE MECHANICAL PARAMETERS OF A PRESSURE VESSEL

CROSS REFERENCE TO RELATED APPLICATIONS

The present application is related to the commonly assigned copending applications Ser. No. 824,309 filed Aug. 12, 1977, Ser. No. 790,536 filed Apr. 25, 1977, (U.S. Pat. No. 4,125,202) Ser. No. 894,374 filed Apr. 7, 1978 and Ser. No. 897,849 filed Apr. 19, 1978 respectively, and to the earlier patents and applications mentioned therein and cited in the files thereof which are also commonly assigned with the present case.

FIELD OF THE INVENTION

The present invention relates to a system for monitoring the mechanics (structural integrity) of a pressure vessel, especially a pressure vessel serving as a primary containment for a nuclear reactor core.

BACKGROUND OF THE INVENTION

It is known to provide as a primary containment for a nuclear reactor core, or, more generally, as a pressure vessel adapted to enclose a nuclear reactor, a cylindrical receptacle provided with a cover or top at a floor or bottom which are composed, together with the cylindrical vessel walls, of cast elements.

As described in the aforementioned application, such elements may be annular or ring elements, segments or sectors and can be stacked to form the cylindrical vessel wall and provided with a cast cover and bottom. The interior of the vessel may be provided with a welded or seamless tubular lining and the cover, base or walls may be formed with fittings communicating with the interior of the vessel to permit operation of the nuclear reactor therewithin.

The principal function of the vessel is to sustain the pressure which is developed within the reactor chamber and to contain any explosive or other sudden pressure increase. In the event of a catastrophe the function of the vessel is to minimize the energy dissipated to the environment.

As indicated, it is known to constitute such pressure vessels from cast elements such as elements composed of cast iron and steel and it is also known to stress or prestress or reinforce such elements with appropriately disposed stressing cables.

For example, the stacked elements may be provided with intercommunicating axial channels through which axial stressing cables can extend, these cables being placed under axial stress and being seated at their opposite ends against the base and cover of the unit.

In general, each "stressing cable" may consist of a multiplicity of individual cable elements in mutually parallel relationship or twisted together. Furthermore, a plurality of such cables can be angularly equispaced about the axis of the vessel and can extend parallel to each other and to the axis thereof through the aforementioned channels. Such cables can constitute the axially extending, axial-stress cables which run through the axial passages in the cast elements of the vessel wall.

In addition, the vessel is provided with peripheral stressing cables which extend circumferentially around the vessel in axially spaced relationship. These circumferentially stressed cables each may also consist of a plurality of cable elements and may have the ends of each cable drawn together by hydraulic or other means to apply the desired degree of inward or radial stress upon the vessel. While the stress may be applied to the external wall of the vessel directly, it can, as the aforementioned applications describe, be applied through shoes which are angularly spaced about the periphery of the vessel and which support the peripheral stressing cable.

It is customary to provide the total set of axial stressing cables from a certain number of normal-operating axial stress cables and a number of additional safety cables which also run parallel to the operating axial stress cables. The total set of axial-stress cables, therefore, is formed by the desired number of operating axial stress cables and the desired number of safety axial stress cables. The safety cables may be disposed between the operating cables. The difference between the operating cables and the safety cables can be negligible although it should be understood that the number of operating axial-stress cables is always equal to the number of cables required to sustain the vessel without distortion under its maximum operating pressure. In other words, the safety cables are required only in case the maximum safe operating pressure is exceeded.

Similarly, the actual number of peripheral stressing cables is made up of the desired number of operating peripheral-stress cables and the desired number of safety peripheral-stress cables, the relationship between the operating and safety peripheral stress cables being the same as that given above for the axial stress cables.

It is customary in connection with such pressure vessels to provide monitoring systems capable of alerting operating personnel to the potential development of catastrophic or disastrous or even unusual conditions. Naturally, the pressure vessel of this type can be provided with pressure sensors to monitor the rate of change in pressure, the pressure itself, the temperature and like internal operating parameters of the system which signal potentially dangerous conditions or even unusual conditions which can lead to malfunction of the reactor. Such monitoring systems are well known in the art and are intended to enable operating personnel to take corrective measures so as to ensure long term operation of the nuclear reactor in a safe manner.

The system, however, requires, for absolute safety, assurance that the mechanical elements of the pressure vessel are in operating shape. This too has been done in the past, generally by monitoring the temperature of the external portions of the vessel.

In other words, it is known to monitor the temperature of the pressure vessel of cast elements to endeavor to ensure that these structural elements will not be adversely effected by the reactor operation.

However, this is not always sufficient and frequently fails to provide sufficient warning of a structural defect in sufficient time to enable corrective measures to be taken.

Hence it is desirable to provide a system in which the mechanics or structural integrity of the system can be monitored more effectively or to a greater degree.

The monitoring of the mechanics or structural integrity of the system is intended here to mean, not the thermal monitoring in the sense described above, but rather monitoring of the bearing strength of the cast structural elements and the walls assembled therefrom, the monitoring of the bearing strength of the cover and base or floor of the pressure vessel, and the monitoring of the stability, strength or fluctuation of other characteristics of the stressing system consisting of the axial stressing and peripheral stressing cables.

The differentiation between normal-operation axial-stress cables and safety axial-stress cables on one hand and the operating peripheral-stress cables and safety-peripheral stress cables on the other, will be understood to relate to the operability of the pressure vessel. In other words, only the normal-operating stressing cables are required to make the pressure vessel fully functional during normal operation.

It is, however, customary to make both systems of stressing cables structurally and functionally interchangeable in the sense that there need be no structural differentiation between a normal-operating stressing cable and a corresponding safety stressing cable.

When, for example, eighteen axial-stressing cables are angularly equispaced about the periphery of the vessel, nine can be constituted as normal-operation stressing cables while nine are constituted safety cables. From a practical point of view it is of no significance whether the even or odd axial stressing cables are the normal-operating cables and the others are the safety cables or vice versa. The same applies for the peripheral stressing cables.

Notwithstanding the progress which has been made, as described above, in developing pressure-retentive structures to serve as nuclear reactor containments, there has been a need for a simple, reliable and long-lived system for detecting failures, defects or structural deficiencies (i.e. monitoring the mechanics) of such vessels to alert the operating personnel of potential danger with respect to the structural integrity of components of the vessel.

Such a monitoring system must be effective whether the deficiency or defect is a defect in the strength of the materials used, a defect in the structural element constituted from the material, a defect in the wall assembled from the cast elements, a defect in the case metal cover, a defect in the cast metal base, or a defect in the one of the cables or stressing elements and, in general, a failure anywhere in the stressing system.

OBJECTS OF THE INVENTION

It is a principal object of the present invention to extend the principles of the aforedescribed applications and to provide an improved pressure-vessel system especially adapted as a primary containment for a nuclear reactor.

Another object of the invention is to provide a monitoring system for a pressure vessel of the class described which fulfills all of the requirements for the surveillance of the structural integrity enumerated above.

Still another object of the invention is to provide a pressure vessel monitoring system which is relatively simple, reliable and long lived which will respond to mechanical or structural deficiencies of the pressure vessel and the stressing system therefore and which is capable of alerting operating personnel to an incipient defect or danger situation.

It is yet another object of the invention to provide an improved method of monitoring the functioning of a pressure vessel of the type described.

SUMMARY OF THE INVENTION

These objects and others which will become apparent hereinafter are attained, in accordance with the present invention, in a system for monitoring mechanical parameters of a pressure vessel or, more generally, the mechanics of such a vessel (i.e. the structural integrity of the walls, cover and base and stressing system of a pressure vessel), particularly a pressure vessel serving as a primary containment for a nuclear reactor, in which at least one of the operating axial-stressing cables and at least one of the operating peripheral-stressing cables are provided with sensor means responsive to a change in the force applied between the respective cable and the vessel or to a change in length of the respective cable, circuit (comparator or threshold) means being connected to the sensors so as to respond to a change representing the attainment of say 90% of the corresponding change upon test pressurization of the vessel to the pressure rating to trigger an alarm and alert the operating personnel to an incipient condition warranting attention.

The circuit means, according to the invention, responds to a threshold at about 90% of the measured parameter given at the full pressure rating of the vessel. In other words if, by calculation or actual test, the measurement of the force or change of length parameter at the stressing cable provided with the sensor has the value p, the alarm will be triggered when p is equal to or greater than 0.9 P (P/P=0.9), where P is the measurement or parameter, corresponding to p, determined by calculation or actual measurement, obtained upon pressurization of the vessel to the full pressure rating (maximum operating pressure) thereof.

According to the invention, the stressing cables provided with the sensors can operate transducers or signal generators producing signals whose outputs represent the integral change in length of force-change parameters of the respective stressing cable, the signal output being electric, mechanical, pneumatic or hydraulic and being applied to a corresponding monitor circuit in which the signal is compared with a set point value or threshold representing 0.9 P or, more generally, 90% of the corresponding parameter.

The system of the present invention thus includes, as a monitoring circuit, a plotter or evaluator in which the threshold value (e.g. 0.9 P) is stored as a control or reference measurement and each signal generator or transducer associated with the respective stressing cable. This evaluating circuit can be provided with an integral alarm or can simply trigger an alarm at a location remote from the vessel.

The threshold (e.g. 0.9 P) to which the monitoring circuit responds can be determined by actual pressurization of the vessel to its rating and measuring the corresponding parameter by the transducers in the respective stressing cable, but more frequently can be calculated with sufficient accuracy so that actual measurements of the value are not necessary.

It is important to the present invention that the alarm be given as soon as the measured parameter p during operation at least one normal-operating axial-stress cable or at least one normal-operating peripheral stress cable reaches the control measurement or threshold.

Naturally, if greater reliability or redundancy is desired, the system can use a so-called "two out of three" switching or like triggering of the alarm. In "two out of three" operation, the alarm is triggered when two out of three axial stressing sensors or two out of three peripheral stressing sensors or two out of three of all of the sensors producing an output signal p which exceeds the corresponding threshold level (e.g. about 0.9 P) as discussed above. Of course, even in such systems, the safety cables can be used interchangeably with the operating cables.

According to another feature of the invention, the measuring means or sensors, responsive to integral length changes or force changes at the prespective stressing cable also provides an output which is compared with the normal operating parameter stored in the evaluating or comparing circuit. For example, if the normal operating parameter is N at the sensor, a further threshold can be provided in the comparator such that when the measured parameter falls for example by 10% or more below the normal operating level, i.e. to 0.9 N or below, an alarm is also given.

This response to measurements which fall below the normal operating parameter of the vessel also allows the system to monitor efficiently the structural integrity of the system. Best results are obtained with a combination of the two responses, i.e. when the system responds both to measurements above the upper threshold and below the lower threshold.

The invention is based upon the descovery that length changes or force changes of the stressing cable, which are smaller than the dimensional or force changes at the pressure rating of the vessel or the value calculated for the latter, can be sustained without any significant danger, but, when they reach approximately 90% of the dimensional changes which would occur at the pressure rating, afford a significant indication of potential danger.

This allows a significant simplification in the monitoring to be attained, since it is not necessary to monitor the stressing cables for actual failure. In fact, when need not monitor the condition elsewhere along the exterior of the vessel if one provides a continuous monitoring of the stressing cable network including at least one normal-operating axial-stress cable and one normal-operating peripheral-stress cable.

Naturally, changes in length or force conditions may occur at other, non-controlled stressing cables. This, however, is found not to be in any way disadvantageous since practically inevitably, even a maximum change in length at one of the stressing cables which are noncontrolled will result in a sufficient displacement or force change at the control cable to pass beyond the indicated threshold and trigger the alarm.

Naturally, when a plurality of cables are controlled, the possibility that dimensional or force changes may develop which are unsensed by the measuring systems is reduced still further.

In a preferred operation of the system of the present invention, all of the normally-operating stressing cables (both axial and peripheral) are provided with dimensional or force-change measuring devices.

In the latter case, the system has maximum reliability and is multiply redundant.

In general, defects in the axial-stress systems result in an increase in the axial length of the pressure vessel and a reduction in the peripheral dimension or circumference thereof. Simultaneously there is a reduction in the force applied in the axial direction and, generally also in the radial direction, in the form of a force between the peripheral cable and the cast body. The radial force can be applied directly to the body or to the shoes mentioned previously.

Defects in the peripheral stressing system will result in an increase in the peripheral dimension and, to a reduced extent, in a reduction in the axial length of the vessel. Simultaneously, there is a reduction in the supporting force between the peripheral-stress system and the cast body in the radial direction as well as a reduction in the force delivered by the axial stress system to the body.

In general, defects in the cast-body elements result in a reduction in the axial dimension and a reduction in the circumferential dimension of the vessel. The forces applied or conducted through the axial-stressing system in the peripheral-stressing system are generally reduced. This underscores, once again, the significance of the combination of the two control modes of the present invention described above.

For carrying out the invention, we prefer to provide a sensor, as indicated previously, for each of the normal-operation cable of the axial-stressing or the peripheral-stressing set.

In accordance with one aspect of the invention, the force or dimensional change measuring device can include a freely-movable unloaded measuring wire which is guided, for example, in a protective tube and forms part of an inductive displacement sensor. Inductive displacement sensors of this type can be linear differential transformers or like displacement-measuring devices known from the servo-mechanism arts.

The device has been found to be particularly effective in the measurement of length changes because, when both the unloaded measuring wires and the loaded or stressing wires are constituted of the same material, the assembly automatically provides for temperature compensation, i.e. the effect of the thermal coefficient of elongation is eliminated or made negligible.

It is also possible to provide a measuring device which makes use of strain gauges. Advantageously, in this case, the strain gauges are provided on heads, spacer sleeves or the like by means of which the axial stressing cables are stressed against the vessel and, in the case of the peripheral stressing cables, upon the spacer bodies which receive the radial forces generated by the peripheral stressing cables as they are supported against the body.

More particularly, the axial-stressing cables can be tensioned with the aid of anchor heads which are supported by spacer sleeves on the vessel cover or bottom, the strain gauges being mounted upon or formed on these spacer sleeves. Naturally, the strain gauges can also be cemented directly upon individual stressing cables.

In the embodiment of the present invention in which the peripheral-stressing cables are provided with strain gauges, here again the strain gauges can be applied (cemented) directly to the cables or can be mounted upon the support shoes or blocks which space the cable from the outer periphery of the cast-iron or cast-steel elements of the vessel structure.

According to yet another feature of the invention, force monitoring is effected by transducers, e.g. piezoelectric devices, or other pressure/electric transducers which act as force transmitting members between the axial-stressing cable system or the peripheral-stressing cable system and the vessel walls. Naturally, only a portion of the force applied by the stressing cable may be transferred to the vessel by the force-transmitting transducers mentioned above.

Naturally, measuring devices of the beforedescribed type are well known in the art and need no detailed description.

BRIEF DESCRIPTION OF THE DRAWING

The above and other features, advantages of the present invention will become more readily apparent from the following description, reference being made to the accompanying drawing in which:

FIG. 16 is an enlarged detailed view of the region VI of FIG. 2; and

SPECIFIC DESCRIPTION

Figure 1:
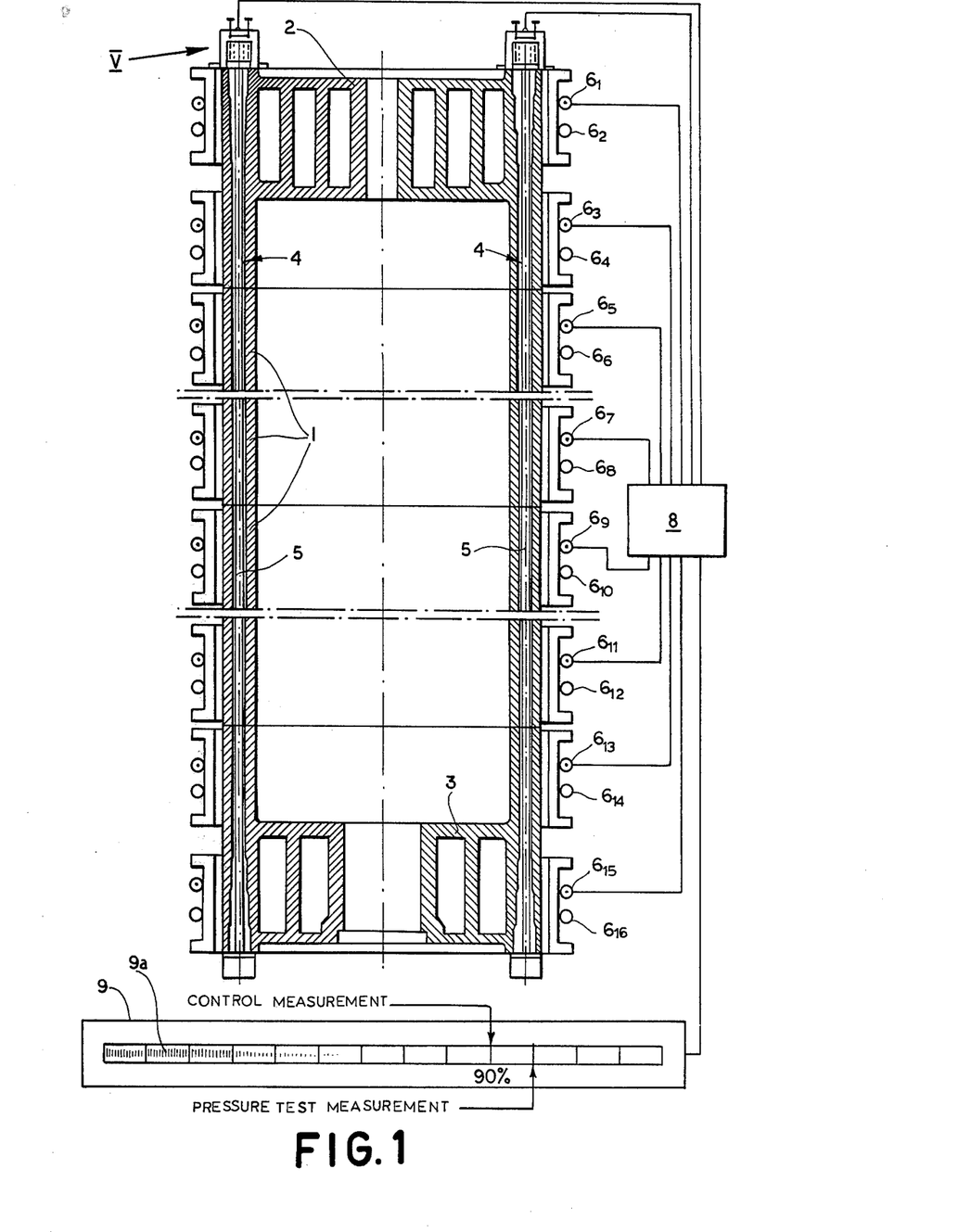
FIG. 1 is an axial cross-sectional view of a pressure vessel provided with a system in accordance with the present invention.
Figure 2:
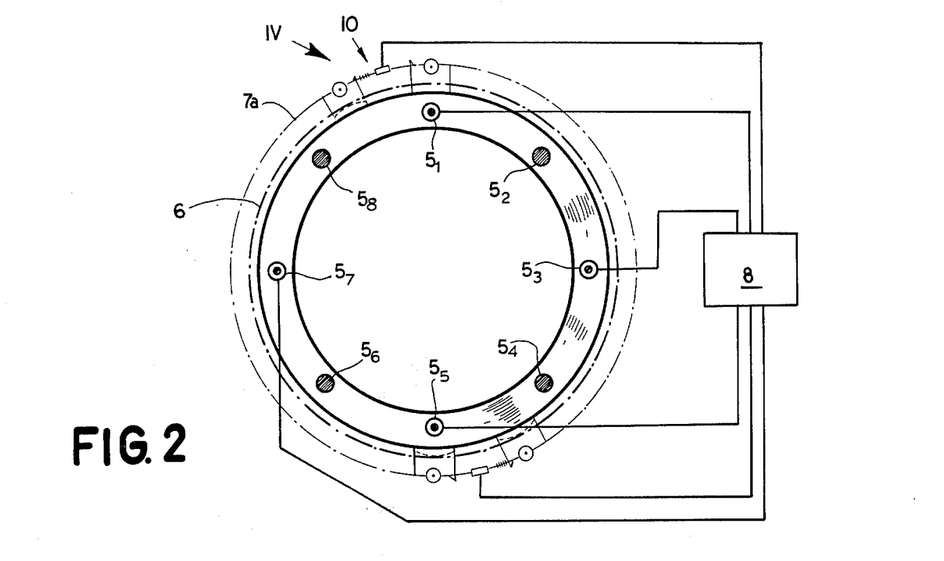
FIG. 2 is a plan view of a system of the type shown in FIG. 1, with a portion of the cover removed and various parts of the device being illustrated diagrammatically.

FIGS. 1 and 2 show a pressure vessel adapted to serve as the primary containment for a nuclear reactor and comprising prefabricated cast iron or steel elements 1, 2 and 3. The cast elements 1 are constituted as rings which are vertically stacked and are formed with aligned channels 4 defining passages for axial-stressing cables 5. Element 2 is a cover member adapted to be fitted over the uppermost element 1 while element 3 is a cast base or floor adapted to be surmounted by the rings 1.

The cast elements may be assembled from sectors and may be internally lined with a shell of steel or the like adapted to receive a nuclear reactor core.

The stressing system for the vessel of FIGS. 1 and 2 includes, in addition to the axial stressing cables 5, external stressing cables 6 which bear via shoes generally represented at 15, against the cast members of the vessel. The shoes apply radial inward force upon tensioning of the peripheral cables 6.

The actual number of axial tension cables is the sum of the normal-operating axial stressing cables and the desired number of additional safety axis stress cables. The actual number of peripheral stressing cables 6 corresponds to the total of the desired number of normal-operation peripheral-stressing cables and the desired number of additional safety stressing cables.

The desired number of normal stressing cables in the axial stressing system and in the peripheral stressing system are determined by the normal-operating conditions of the vessel and are adapted to take up all of the stresses developed during normal operation within the pressure rating of the vessel.

In FIG. 2 eight axial stressing cables 5 are provided and those with the subscripts 1, 3, 5, and 7 are constituted as the normal stressing cables. The safety stressing cables are represented by the subscripts 2, 4, 6, and 8 and alternate with the normal-operation stressing cables.

Correspondingly, the normal-stressing cables and safety-stressing cables of the peripheral stressing system alternate in vertically spaced relationship along the vessel as well. The normal stressing cables 6 are those with odd subscripts while the stressing cables 6 with even subscripts are the safety cables.

In the embodiment illustrated, the normal stressing axial cables and the normal stressing peripheral cables are provided with force or length measuring devices 7 of a measuring circuit 8 which is provided with a threshold unit of comparator 9.

The threshold unit or comparator 9 stores a control measurement which is a fraction, for example 90%, of the corresponding measurement for each sensor 7 which develops upon the pressurization of the vessel to the rated pressure thereof, i.e. the maximum operating pressure of the vessel. The comparator circuit 9 also includes an alarm which signals the operating personnel as soon as the measured value at one of the normal-operating axial-stressing cables 5 or the normal-operating peripheral-stressing cables 6 reaches the control level or value. This represented by a scale 9a of the comparator circuit 9 which can include a plotter, shown below in FIG. 1 and representing the control measurement level, the rated measurement level and a scale of measurements upon which the actual measurements of the devices 7 can be read.

The comparator 9 also triggers the alarm when the measured values drop more than 10% below a normal operating value for the normal operating axial-stressing and peripheral-stressing cables.

Figure 3:
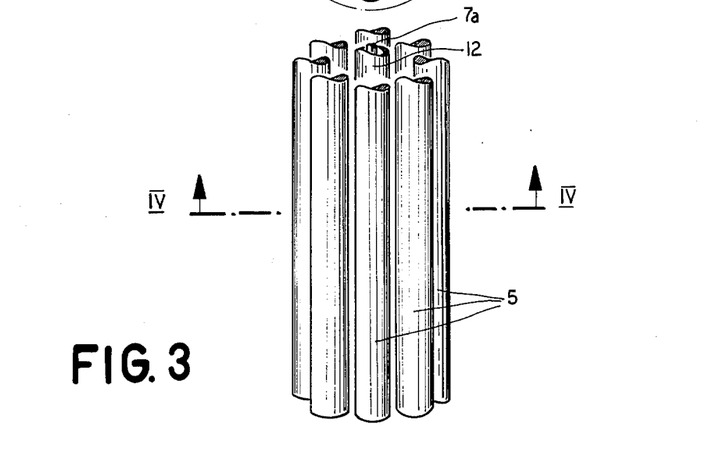
FIG. 3 is a perspective view of a portion of an axial-stressing cable of the type used in the embodiment of FIGS. 1 and 2.
Figure 4:
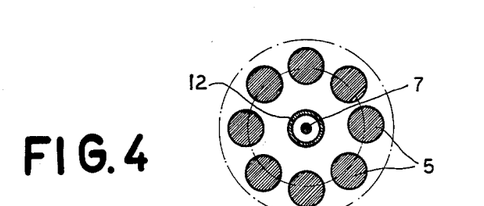
FIG. 4 is a cross-sectional view taken along the line IV—IV of FIG. 3.

FIGS. 3 and 4 illustrate a preferred embodiment of the measuring devices of the present invention. For example, the measuring units 7 for axial-stressing cables 5 or for the peripheral-stressing cables 6, each of which can comprise a number of individual cable elements, can include a freely movable measuring wire 7a which is provided with an inductive pickup 10. The inductive pickup may form part of a linear differential transformer of the displacement-measuring type used in servomechanism practice.

The measuring wires 7a can be freely movable in a protective tube 12. The pickup 10 is shown in FIG. 5 of the anchor head 11 of the axial-stressing cables 5.

When inductive pickups 10 are provided, they can be mounted in the turnbuckles or cable-stressing units for the peripheral-stressing cables not shown.

Figure 5:
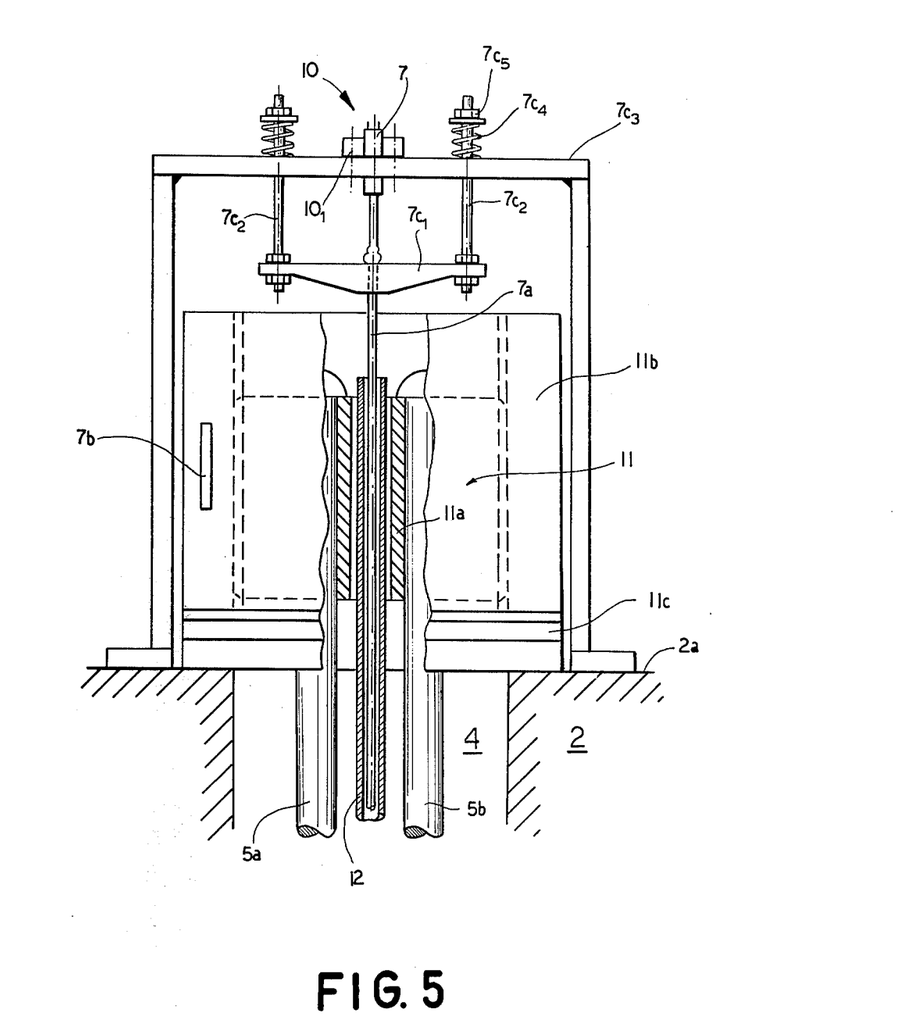
FIG. 5 is an enlarged detail view of the region V of FIG. 1.
Figure 6:
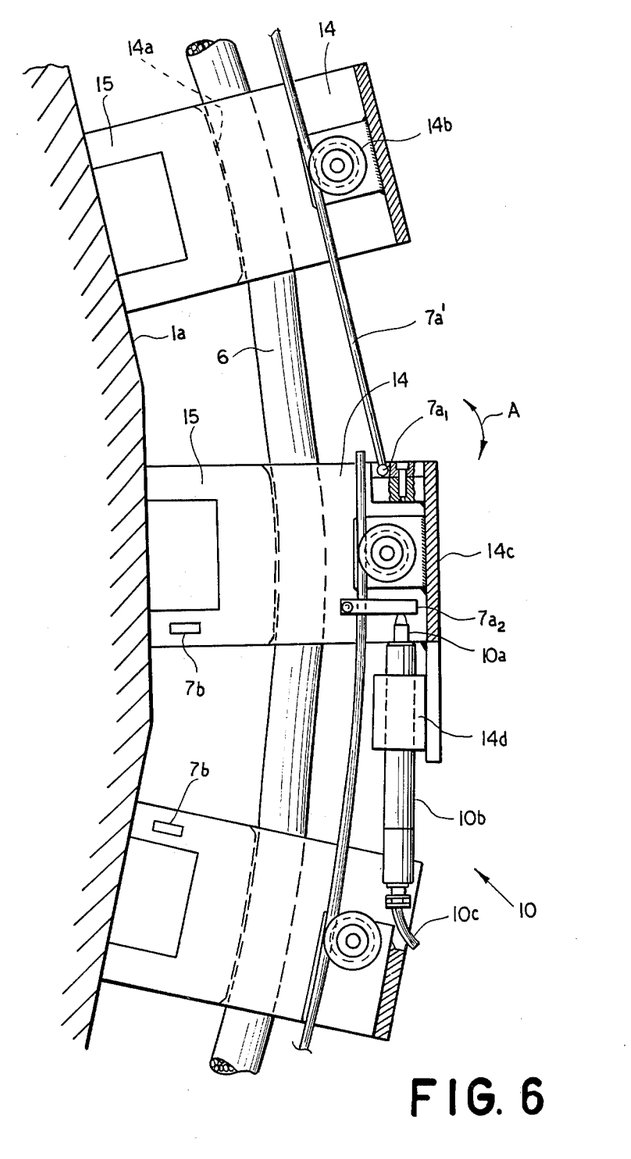

It is also possible to make use of strain gauge strips as force measuring elements as has been illustrated in FIGS. 5 and 6. In FIG. 5, for example, it will be apparent that the anchor head 11 bears via a spacer sleeve on the cover 2. A corresponding spacer sleeve can engage against the bottom of the vessel 3. The spacer sleeves are provided with strain gauges strips 7b whose outputs thus represent the compressive force applied to the vessel.

From FIG. 6 it will be apparent that the peripheral stress in cables 6 bear via shoes 14 radially inwardly upon the wall of the vessel and are supported thereagainst by ribs 15. The ribs 15 are here provided with the strain gauge strips. These strain gauge strips thus constitute measuring transducers 7 for the integral length changes in terms of the compression of the shoes or spacer sleeves.

Figure 7:
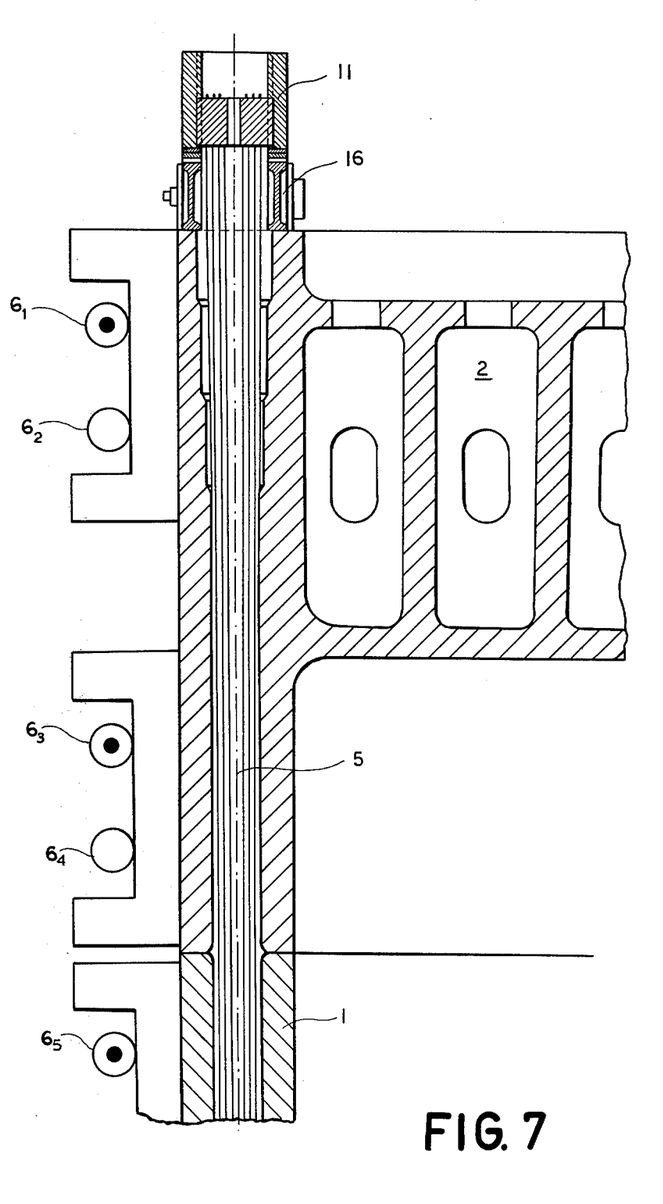
FIG. 7 is a cross-sectional view similar to FIG. 5 but illustrating another embodiment of the present invention.

FIG. 7 shows another embodiment in which the force is measured. In this embodiment, beneath the anchor head 11 for the axial stressing cables 5, transducers 16 are provided which are under pressure so that at least part of the axial force of the cables applied to the vessel is transmitted by the transducers 16 whose output signals this force. Naturally, the measuring devices can also be provided directly on the stressing cables, e.g. as strain gauges, or otherwise integrated therewith.

Referring now to FIG. 6 in some detail, it will be apparent that the peripheral stressing cable rests against a seat 14a formed in the shoe 14 above the ribs 15 which bear directly against the outer wall 1a of the vessel. The shoe 14 also can be provided with a guide, e.g. via rollers 14b, for a measuring wire 7a' which is anchored at 7a₁ to one of the shoes 14c. The other end of the wire 7a' is provided with a bar 7a₂ against which the armature 10a of a linear differential transformer 10b bears. The linear differential transformer 10b is anchored in a block 14b in a shoe 14c and has its output connected via a conductor 10c to the comparator and plotting circuit. Thus dimensional changes in the peripheral stressing cables 6 are reflected by spreading or contracting movements of the wire 7a' as represented by the arrow A and result in a corresponding displacement of the armature 10a of the linear differential transformer 10b.

In FIG. 7 it will be apparent that the numerous strands 5a, 5b, etc. of the axial cable 5 can be anchored in a block 11a of the tensioning head 11 previously mentioned. In this case, a threaded sleeve 11b threadedly engages the block 11a and can be tightened by a ridge as a knot or the like to bear via washers 11c upon the spacer sleeve which is here formed as the transducer 16. The transducer 16 can include piezo electric elements whose output directly measures the force applied through the sleeve 16 to the upper surface 2a of the cover. Naturally, a corresponding device may be provided on the opposite end of each cable provided with a measuring unit.

A somewhat different tensioning system is provided in the embodiment of FIG. 5 wherein, again, the individual members 5a and 5b are anchored in the block 11a which is tubular to pass the measuring wire 7a and the protective tube 12. The block 11a is externally threaded and is received in the nut 11b which can be rotated via a wrench and can bear through washers 11c upon the upper surfaces 2a of the cover 2. In this embodiment, however, the freely movable wires 7a is engaged by a spider 7c₁ which is supported via rods 7c₂ upon a frame 7c₃ also resting against the surface 2a. Springs 7c₄ bear against nuts 7c₅ which are threaded onto the rods 7c₂. The wire 7a, in turn, passes into the linear differential transformer 10 which is mounted at 10₁ upon the upper member of the frame 7c₂. Here again, changes in the effective length of the cables 5 are represented by a corresponding linear displacement of the wires 7a and a corresponding output of the linear differential transformer 10.

I claim:

1. A system for monitoring the structural integrity of a pressure vessel, comprising, in combination:
   a generally cylindrical pressure vessel assembled from a plurality of cast elements and formed with angularly spaced axially extending passages;
   an array of angularly spaced axially extending axial-stressing cables passing through said passages and axially stressed against said vessel, said axial-stressing cables including a number of normal-operation axial stressing cables adapted to take up these axial stresses of said vessel during normal operation and safety axial-stressing cables provided in addition to the normal-operating axial-stressing cables;
   an array of peripheral stressing cables bearing upon the periphery of said vessel and spaced therealong, said peripheral-stressing cables extending circumferentially about said vessel and including normal-operating peripheral-stressing cables adapted to take up all of the radial forces developed by said vessel during normal operation thereof, and safety peripheralstressing cables provided in addition to said normal-operating peripheral-stressing cables;
   at least one measuring device associated with one of said normal-operating cables for producing a signal representing the change in length of said one of said cables and the force applied thereby to said vessel;
   circuit means connected to said device and adapted to store a threshold value representing a fraction of the measurement produced by said device at the maximum safe operating pressure of said vessel; and
   means connected to said circuit means for signaling an alarm upon the actual measured value of the signal produced by said device reaching said threshold value, said threshold value being substantially 90% of the value which would be measured by said device at the maximum safe operating pressure of said vessel, said circuit means also being provided with a further stored threshold value of at least 10% below a normal operating pressure of said vessel, said means for signaling said alarm responding to a fall in the actual value of the measurement by said device below the further threshold value.

2. The combination defined in claim 1 wherein at least one further such device is provided and one of said devices is connected to a cable of one of said arrays and the other said device is connected to a cable of the other array.

3. The combination defined in claim 2 wherein each of said normal-operating cables is provided with at least one such device, all of said devices being connected to said circuit means.

4. The combination defined in claim 1 wherein said device includes at least one strain gauge strip operatively coupled with one of said cables.

5. The combination defined in claim 4 wherein one of said cables is provided with an anchor head bearing via a spacer sleeve upon said vessel, said strain gauge strip being secured to said sleeve.

6. The combination defined in claim 5 wherein said one of said cables is a peripheral stressing cable and bears against said vessel via a pressure shoe, said strain gauge strip being secured to said pressure shoe.

7. A system for monitoring the structural integrity of a pressure vessel, comprising, in combination:
   a generally cylindrical pressure vessel assembled from a plurality of cast elements and formed with angularly spaced axially extending passages;
   an array of angularly spaced axially extending axial-stressing cables passing through said passages and axially stressed against said vessel, said axial-stressing cables including a number of normal-operation axial stressing cables adapted to take up these axial stresses of said vessel during normal operation and safety axial-stressing cables provided in addition to the normal-operating axial-stressing cables;
   an array of peripheral stressing cables bearing upon the periphery of said vessel and spaced therealong, said peripheral-stressing cables extending circumferentially about said vessel and including normal-operating peripheral-stressing cables adapted to take up all of the radial forces developed by said vessel during normal operation thereof, and safety peripheral-stressing cables provided in addition to said normal-operating peripheral-stressing cables;

at least one measuring device associated with one of said normal-operating cables for producing a signal representing the change in length of said one of said cables and the force applied thereby to said vessel;

circuit means connected to said device and adapted to store a threshold value representing a fraction of the measurement produced by said device at the maximum safe operating pressure of said vessel; and means connected to said circuit means for signaling an alarm upon the actual measured value of the signal produced by said device reaching said threshold value, said device including a freely movable cable extending along said one of said cables and provided with an inductive displacement-measuring element responsive to the displacement of the freely movable wire.

8. The combination defined in claim 7 further comprising a protective tube surrounding said wire.

9. The combination defind in claim 7 wherein said device includes at least one strain gauge strip operatively coupled with one of said cables.

10. The combination defined in claim 9 wherein one of said cables is provided with an anchor head bearing via a spacer sleeve upon said vessel, said strain gauge strip being secured to said sleeve.

11. The combination defined in claim 9 wherein said one of said cables is a peripheral stressing cable and bears against said vessel via a pressure shoe, said strain gauge strip being secured to said pressure shoe.

12. The combination defined in claim 7 wherein said threshold value is substantially 90% of the value which would be measured by said device at the maximum safe operating pressure of said vessel.

13. The combination defined in claim 7 wherein at least one further such device is provided and one of said devices is connected to a cable of one of said arrays and the other said device is connected to a cable of the other array.

14. The combination defined in claim 13 wherein each of said normal-operating cables is provided with at least one such device, all of said devices being connected to said circuit means.

* * * * *